Figure 1:
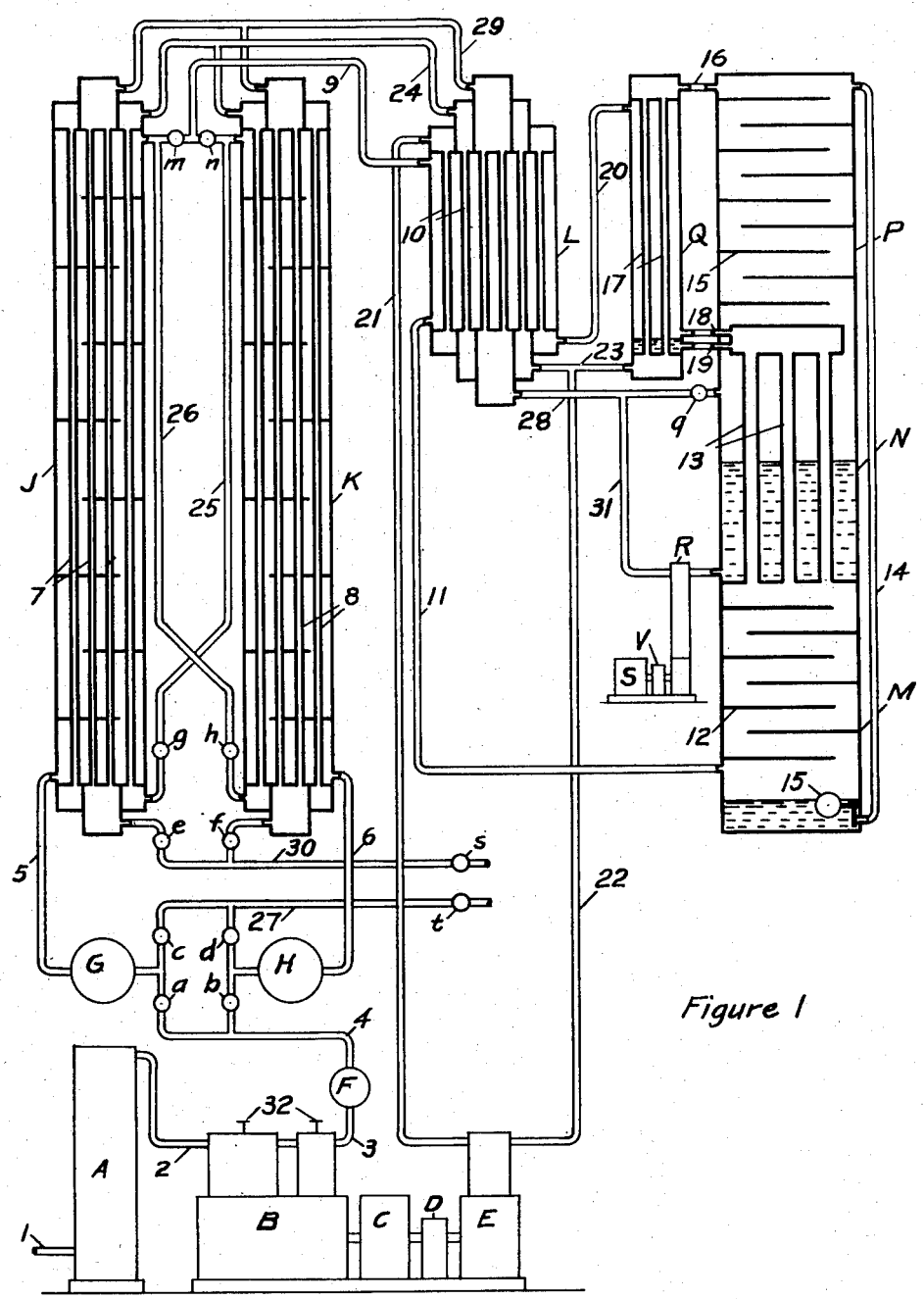

Sept. 18, 1951     W. L. DE BAUFRE     2,568,223
PROCESS AND APPARATUS FOR EXTRACTING
OXYGEN FROM ATMOSPHERIC AIR Filed Oct. 20, 1944     2 Sheets-Sheet 1

INVENTOR: Wm. L. De Baufre

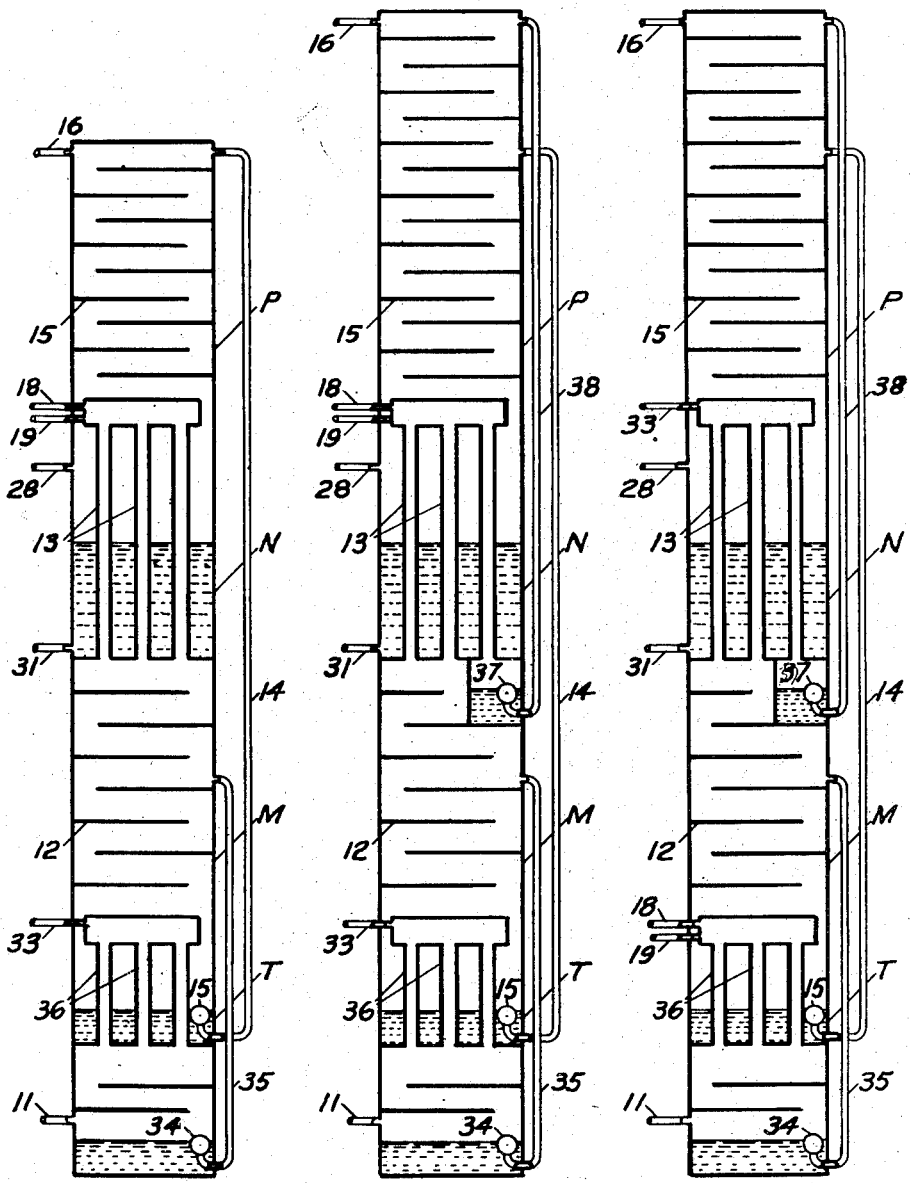

Patented Sept. 18, 1951

2,568,223

UNITED STATES PATENT OFFICE 2,568,223

PROCESS AND APPARATUS FOR EXTRACTING OXYGEN FROM ATMOSPHERIC AIR

William Lane De Baufre, Lincoln, Nebr.

Application October 20, 1944, Serial No. 559,620

9 Claims. (Cl. 62—123)

This invention relates to the art of extracting oxygen from atmospheric air for use in high altitude airplanes and for cutting, welding and other industrial purposes. It is particularly applicable to small plants to be operated with minimum attention and maximum safety. The process and apparatus, however, can be applied to plants of the largest size.

Heretofore, small oxygen plants have been operated with pressures from 1500 to 3000 lb. gage in order to obtain the refrigeration necessary to balance heat leak into the apparatus, which must be at very low temperatures to liquefy atmospheric air and rectify it to extract oxygen therefrom. These small oxygen plants have been started by compressing atmospheric air to 3000 lb. gage. The pressure has fallen to say 1500 lb. gage during normal operation. These high pressures are necessary to obtain the required refrigeration by throttling the compressed air.

Large oxygen plants have operated at lower compressed air pressures than these small oxygen plants by using an expansion engine to remove excess heat from the system. Atmospheric air has been compressed to about 500 lb. gage and most of it has been expanded to about 75 lb. gage in order to liquefy the remainder. The expanded air and the liquefied air have been subjected to a preliminary rectification under the pressure of about 75 lb. gage. The separated portions of the air have been subjected to a final rectification at about atmospheric pressure. The drop in pressure from 75 lb. gage to about atmospheric was necessary for heat exchange between the preliminary and the final rectifications. The drop in pressure from 500 lb. gage by expansion in an engine to 75 lb. gage was necessary for obtaining the required refrigeration.

The present invention utilizes an expansion engine; but instead of superimposing the pressure drop for expansion to remove excess heat upon the pressure drop for heat transfer in rectification, these two pressure drops are arranged in parallel. That is, the same pressure drop is utilized both for expansion to obtain refrigeration and for heat transfer in rectification. By so doing, small oxygen plants may be operated with compressed air pressures of 75 to 150 lb. gage instead of 1500 to 3000 lb. gage. These low compressed air pressures are much safer than the very high compressed air pressures heretofore used. The margin of safety in the design of apparatus can be much higher without excessive masses of material to be cooled to operating temperatures with consequent loss of operating time and of energy in the stored up refrigeration. The principal object of the invention is to make an oxygen plant which can be operated at relatively low compressed air pressures.

In order to accomplish this objective in an efficient manner, it is necessary to arrange the process and the apparatus so as to recover as much as possible of the oxygen in the atmospheric air compressed. In the simplest form of oxygen plant, there must be a preliminary rectification of the compressed air before expansion of a portion of it to remove excess heat from the process in order to reduce loss of oxygen in the expanded portion. Another object of the invention is to recover as much as possible of the oxygen in the portion of the compressed air expanded to obtain refrigeration.

The oxygen product of the process is produced by a final rectification of the unexpanded portion of the compressed air. In this final rectification to produce high purity oxygen, there is a further loss of oxygen in the nitrogen product of the final rectification. A further object of the invention is to reduce the loss of oxygen in the nitrogen product of the final rectification.

With low operating pressures, compressed air holds more water vapor than in oxygen plants with high operating pressures. If this water vapor were carried into the apparatus where it would be condensed into liquid or deposited as frost on cooling surfaces, the refrigeration requirements of the process would be appreciably increased. To avoid this, most of the water vapor should be removed by passing the compressed air through absorbent material to reduce the partial pressure of water vapor before cooling the compressed air. Some water vapor will remain, however, to be deposited as frost on the cooling surfaces. A further object of the invention is to provide means for removing such frost and for re-activating the absorbent material.

During normal operation, refrigeration requirements of the process will vary due to changing heat leak into the apparatus, etc. This results in variations in levels of liquids accumulated in the apparatus. Heretofore, it has been necessary for the operator to watch liquid levels constantly in an oxygen plant in order to change the operating pressure by manual control of throttle valves to adjust the refrigeration produced to balance the refrigeration requirements. A further object of the invention is to eliminate all attention to liquid levels and to adjust automatically the refrigeration produced to the refrigeration requirements.

Incidental objectives are elimination of thermodynamic losses due to throttling, utilization of heat exchanges to their maximum possibilities in producing rectification, and production of the oxygen product in the form desired, namely, as a gas or as a liquid and under high pressure or under low pressure.

The foregoing objects together with such additional and subsidiary advantages as may hereinafter appear or are incident to the invention, are realized by the novel process and apparatus described herein and shown in preferred form on the drawings as follows:

Figure 1 shows a schematic arrangement of a plant for extracting oxygen from atmospheric air in accordance with the above enunciated principles. Figure 2 shows a modified form of rectifying column for reducing loss of oxygen in the expanded portion of the compressed air. Figure 3 shows a further modification for increasing recovery of oxygen in the product of final rectification. Figure 4 shows a third modification in the rectifying column for increasing the refrigeration produced by expanding a portion of the compressed air. These modifications are particularly useful in extracting oxygen in liquid form.

The apparatus shown in Figures 1, 2, 3 and 4 comprises:

(1) Scrubbing tower A for removing carbon dioxide from the atmospheric air to be processed.

(2) Two-stage compressor B for compressing the atmospheric air, driven by motor C.

(3) Expander E for removing excess heat from the process, connected to compressor B and motor C through speed changing device D.

(4) After-cooler F for removing heat of compression from the compressed air.

(5) Driers G and H for reducing the partial pressure of water vapor in the compressed air.

(6) Interchangers J and K for cooling the compressed air by heat exchange with returning components separated therefrom.

(7) Liquefier L for further cooling and partly liquefying the compressed air by heat exchange with returning components separated therefrom, and also for superheating the separated portion to be expanded in expander E.

(8) Rectifying column containing preliminary rectifier M, vaporizer N and final rectifier P as shown in Figure 1. In Figures 2, 3 and 4, the rectifying column also contains preliminary vaporizer T.

(9) Condenser Q for utilizing refrigeration in the nitrogen vapor product of final rectifier P to augment reflux liquid in preliminary rectifier M.

(10) Liquid oxygen pump R driven by motor S through speed changing device V for withdrawing the oxygen product in liquid form from the rectifying column.

Referring to Figure 1, atmospheric air from which oxygen is to be extracted, enters the plant through pipe 1. Flowing up through scrubbing tower A, the air is subjected to down flowing liquid for removing carbon dioxide. From scrubbing tower A, the carbon dioxide free air flows through pipe 2 to the first stage of compressor B. In the two stages of compressor B, the air is compressed to the pressure necessary to meet the requirements of the process. The pressure of the compressed air may be from 5 to 12 atmospheres gage for producing gaseous oxygen. A somewhat higher pressure may be used to produce liquid oxygen or at starting the plant. The compressed atmospheric air leaves through pipe 3 and is cooled to about atmospheric temperature in after-cooler F. An intercooler between stages is not shown in Figure 1 because an intercooler would usually be a component part of two-stage compressor B.

Leaving after-cooler F through pipe 4, the compressed air flows through valve a, valve b being closed. With valve c closed, the compressed air flows through drier G where the moisture vapor is reduced to a low partial pressure. The dried compressed air then flows through pipe 5 to interchanger J where it is cooled while flowing back and forth across tubes 7. The cooled compressed air leaves the upper end of interchanger J through valve m. Valve h is closed, so that the cooled compressed air cannot flow through pipe 26.

Valve n is also closed, so that the cooled compressed air flows through pipe 9 to liquefier L where it is further cooled and partly liquefied in the space surrounding tubes 10. The partly liquefied compressed air flows through pipe 11 to preliminary rectifier M where the liquefied part drops to the bottom and the vapor rises through trays 12. Within tubes 13, the rising vapor is partly liquefied to form reflux liquid which flows down through trays 12. As a result of rectifying action, the compressed air is separated into a nitrogen-rich vapor and an oxygen-rich liquid. The oxygen-rich liquid accumulates at the bottom of preliminary rectifier M and is automatically discharged through pipe 14 by a valve controlled by float 45 which maintains a nearly constant liquid level. The pressure in preliminary rectifier M is substantially the same as the discharge pressure of compressor B, there being no throttle valves to reduce the compressed air pressure.

The oxygen-rich liquid in pipe 14 is partly vaporized by reduction in pressure from preliminary rectifier M to final rectifier P, where the pressure is about atmospheric. The liquid part flows down through trays 15 until it reaches the space surrounding tubes 13 in vaporizer N. Here the liquid is partly vaporized by heat exchange with nitrogen-rich vapor within tubes 13 from preliminary rectifier M. The resulting oxygen-rich vapor rises through trays 15 as reflux vapor. Rectifying action separates the entering oxygen-rich liquid into a nitrogen vapor product which leaves through pipe 16 and an oxygen liquid product which accumulates around tubes 13.

The nitrogen vapor product from final rectifier P flows through tubes 17 within condenser Q. Nitrogen-rich vapor from preliminary rectifier M enters condenser Q through pipe 18 and is partly condensed by heat exchange with the nitrogen vapor product from final rectifier P. The resulting liquid returns through pipe 19 to preliminary rectifier M where it augments the reflux liquid therein.

The remaining nitrogen-rich vapor flows through pipe 20 to liquefier L where the nitrogen-rich vapor is superheated in flowing through tubes 10 by heat exchange with compressed air being cooled and partly liquefied around tubes 10. The superheated nitrogen-rich vapor flows through pipe 21 to expander E. Here the nitrogen-rich vapor is cooled by external work in expanding nearly to atmospheric pressure and returns through pipe 22 to commingle with the nitrogen vapor product of final rectifier P returning through pipe 23 from condenser Q.

The commingled expanded nitrogen-rich vapor and nitrogen vapor product return through tubes 10 in liquefier L in heat exchange with compressed air around tubes 10. The commingled expanded nitrogen-rich vapor and nitrogen vapor product then return through pipe 24 to interchanger J where these nitrogen-rich gases flow through tubes 7 and are warmed to about atmospheric temperature by heat exchange with compressed air surrounding tubes 7.

The warmed nitrogen-rich gases flow through valve g and pipe 25 to the space surrounding tubes 8 in interchanger K. Here the warm dry nitrogen-rich gases pick up frost which had previously been deposited on the surfaces of tubes 8 by compressed air being cooled in interchanger K. The nitrogen-rich gases then flow through drier H where the drying material is re-activated by absorption of moisture therefrom. With valve d open, the nitrogen-rich gases flow through pipe 27 and are finally discharged through valve t. Valve t may be hand operated throttle valve or an automatic pressure relief valve for controlling the pressure in final rectifier P.

The oxygen liquid product accumulating around tubes 13 in vaporizer N may be withdrawn in liquid form by pump R or may first be vaporized by heat exchange with nitrogen-rich vapor within tubes 13 and then withdrawn in gaseous form through valve q. In the latter case, valve q is opened wide and the oxygen vapor product flows through pipe 28, through tubes 10 within liquefier L, through pipe 29, through tubes 7 within interchanger J through valve e, through pipe 30 and finally leaves through valve s. Valve f is closed. Valve s controls the flow of the oxygen product and may be hand operated or may be an automatic valve for maintaining any desired rate of flow of oxygen for which the valve is set.

If the oxygen product is to be removed in liquid form from vaporizer N, valve q is closed. Pump R is run at any desired speed by motor S through speed changing device V which is set to withdraw the liquid oxygen at a desired rate. The liquid oxygen is forced through pipes 31 and 28 into tubes 10 within liquefier L where the liquid oxygen is vaporized under the existing pressure. The vaporized oxygen is warmed to about atmospheric temperature within tubes 7 in interchanger J and is discharged through valve s against whatever pressure may exist beyond this valve. If pipe 30 is connected to steel bottles for storage of oxygen gas under high pressure, pump R will discharge the liquid oxygen against that pressure and the liquid oxygen will be vaporized under that pressure within the tubes of liquefier L.

After a period of operation as described, frost will accumulate on tubes 7 within interchanger J because the absorbent material within drier G will not remove all water vapor from the compressed air. Valves b, c, f, h and n are then opened and valves a, d, e, g and m are closed. The compressed air then flows through valve b to drier H containing re-activated material for absorbing water vapor. With the partial pressure of water vapor reduced, the compressed air flows through pipe 6 to interchanger K. Valve f being open, the oxygen product of the final rectification returns through tubes 8 in interchanger K. Valves h and c being open, the nitrogen-rich gases also return through tubes 8 in interchanger K. These returning gases are warmed to about atmospheric temperature in cooling the compressed air surrounding tubes 8. The nitrogen-rich gases flow through pipe 26 to interchanger J. Being dry and warmed to about atmospheric temperature, these nitrogen-rich gases will absorb frost on tubes 7 and will warm interchanger J. Flowing through pipe 5 to drier G, these nitrogen-rich gases will re-activate the drying material by absorbing moisture therefrom.

The ten change-over valves listed above may be arranged to be operated from a central point and the change-over may be automatically controlled to occur at any desired interval of time. Also, the returning nitrogen-rich gases may be warmed above atmospheric temperature in a heater provided for the purpose, before the gas flows through the drier, as claimed in U. S. Patent No. 2,093,805, issued September 21, 1937.

After a long period of operation, it is desirable to warm the whole plant to room temperature in order to defrost all parts. It is subsequently necessary to cool the plant to operating temperatures before oxygen can again be produced. The plant can be cooled more quickly by compressing the air to a higher pressure than required during normal operation because more refrigeration is then produced by expansion of the compressed air. Since all compressed air must pass through the expander when none is liquefied, the compression pressure will rise above the normal operating pressure. A further rise in compression pressure results from the fact that the compressed air reaches the expander at a higher temperature at starting the plant than during normal operation. In fact, the rise in compression pressure will be excessive unless the relative capacity of the expander is increased or the relative capacity of the compressor is decreased at starting.

If the expander is of the reciprocating positive displacement type as indicated in Figure 1, its relative capacity can be increased by increasing its rotative speed relative to the compressor. This can be done by adjusting speed changing device D. If expander E were provided with variable cut-off, the point of cut-off could be changed instead of adjusting speed changing device D. An equivalent device would be a turbine expander with additional nozzles which could be opened to increase the flow of compressed air with the same initial pressure.

The capacity of the compressor can be reduced relative to the expander by providing clearance pockets and opening valves to these pockets at starting. Handles for such valves are indicated at 32 in Figure 1.

As operating temperatures are approached, the compressed air pressure is reduced by reason of its increased density at the inlet to the expander. The relative capacity of the compressor can then be increased by closing valves 32 to the clearance pockets or the relative capacity of the expander can be reduced by adjustment of speed changing device D to reduce its rotative speed. The maximum refrigeration is then maintained to build up liquids within preliminary rectifier M, vaporizer N and final rectifier P. When these liquids reach operating levels, the compressed air pressure has become normal for the refrigeration requirements of the process.

The refrigeration requirements vary with heat leak into the process and other factors and such variations are first reflected by a change of liquid level in vaporizer N. If the refrigeration requirements increase, this liquid level will fall with the result that the wetted surface of tubes 13 is reduced. Only the wetted surface is effective in transferring heat from the nitrogen-rich vapor of the preliminary rectification to the liquid oxygen product of the final rectification. Consequently, when this wetted surface is reduced, the temperature difference must increase to transfer the same quantity of heat in unit time. With the same final rectification pressure, there must be an increase in the preliminary rectification pressure which is substantially the initial pressure at the expander. With higher initial pressure at the expander, more external work is done by expansion. Consequently, more heat is removed from the process to balance the increased refrigeration requirements.

The whole system thus adjusts itself automatically to varying requirements for refrigeration from time to time. The external work of expander E. is recovered in driving cimpressor B. No attention of the operator is necessary to liquid levels in the apparatus. The rate of withdrawal of the oxygen product may be adjusted from time to time in accordance with the purity desired or the quantity of oxygen needed. Change over of interchangers and driers is necessary at intervals if not made automatically. Attention must be given to lubrication of compressor and expander and to change of solution in the scrubbing tower.

The apparatus is shown in preferred form for small plants in Figure 1; but modifications in Figures 2, 3 and 4 may be made in the rectifying colume in order to increase the yield of oxygen in larger plants or to withdraw oxygen from the plant in liquid form. In order to increase the yield of oxygen, it is necessary to carry rectifying action below the inlet for the partly liquefied air into the preliminary rectifier. Otherwise, as in Figure 1, the amount of oxygen in the oxygen-rich liquid will be limited by the phase relation of entering liquid and vapor and the ratio of oxygen-rich liquid to nitrogen-rich vapor flowing to the expander. The yield of oxygen may also be increased by extending the rectifying action above the inlet for the oxygen-rich liquid into the final rectifier. Otherwise, as in Figure 1, loss of oxygen in the nitrogen-vapor product of the final rectification is determined by the phase relation of vapor and liquid at the inlet.

In Figure 2, reflux vapor for carrying the rectification below the inlet to the preliminary rectifier is obtained by liquefying the compressed air completely in heat exchange with the oxygen-rich liquid. For this purpose, preliminary vaporizer T is added at the bottom of the preliminary rectifier. Non-condensible gases are bled through pipe 33. The liquefied air is automatically discharged by float controlled valve 34 through pipe 35 onto an intermediate tray within preliminary rectifier M. The pressure of the compressed air entering through pipe 11 will automatically increase until the air is completely liquefied within tubes 36 in heat exchange with the oxygen-rich liquid surrounding tubes 36. Vaporization of this oxygen-rich liquid provides reflux vapor for carrying the rectification below the inlet for the liquefied compressed air, trays being added for this purpose. Otherwise, the rectifying column in Figure 2 is the same as shown in Figure 1 and is lettered accordingly.

In Figure 3, reflux liquid for extending rectification in the final rectifier above the inlet for oxygen-rich liquid is obtained by liquefying part of the nitrogen-rich vapor in the preliminary rectifier. Tubes 13 in vaporizer N are divided into two groups. In one group, the rising nitrogen-rich vapor is partly liquefied to provide reflux liquid for the preliminary rectification. Part of the remaining nitrogen-rich vapor is withdrawn through pipe 18 to furnish refrigeration by expansion. The remaining part of the nitrogen-rich vapor is liquefied within the other group of tubes 13. This nitrogen-rich liquid is automatically discharged by float controlled valve 37 through pipe 38 onto the topmost tray in final rectifier P. Additional trays have been added above the inlet for the oxygen-rich liquid from the preliminary rectification in order to extend the rectification and obtain a vapor product richer in nitrogen than would be produced by the rectifying column of Figure 2. Otherwise, the rectifying column in Figure 3 is the same as in Figure 2 and has been lettered accordingly.

In Figure 4, nitrogen-rich vapor for furnishing refrigeration by expansion, is withdrawn through pipe 18 at the pressure of compression rather than at reduced pressure as in Figure 3. This provides more refrigeration for the same mass flow of nitrogen-rich vapor withdrawn. More extensive selective liquefaction (rectification) should be provided for the compressed air in Figure 4 than in Figure 3 where the object is simply to discharge non-condensible gases. In Figure 4, pipe 33 for discharging non-condensible gases is attached to the top head for tubes 13 in vaporizer N in order to withdraw any non-condensible gases that might pass through pipe 35 in solution in the oxygen-rich portion of the compressed air. Otherwise, the arrangement of the rectifying column in Figure 4 is the same as in Figure 3 and has been lettered accordingly.

Having described the operation of the process and the arrangement of the apparatus for my novel system of extracting oxygen from atmospheric air, I claim:

1. Process of extracting oxygen from atmospheric air including compressing the atmospheric air, passing the compressed air through absorbent material which absorbs moisture therefrom, passing the partly dried compressed air over cooling surfaces on which frost is deposited as the compressed air is cooled by heat exchange with returning nitrogen-rich gas, further cooling and more or less liquefying the dried compressed air, subjecting the more or less liquefied compressed air to a preliminary rectification to separate it into nitrogen-rich gas and oxygen-rich liquid, subjecting the oxygen-rich liquid to a final rectification under reduced pressure to separate it into a nitrogen-gas product and an oxygen-liquid product, vaporizing part of the oxygen-liquid product for utilization as reflux vapor in the final rectification by heat exchange with the nitrogen-rich gas to liquefy part of it for utilization as reflux liquid in the preliminary rectification, expanding the remaining nitrogen-rich gas with performance of external work to remove excess heat from the process, returning the expanded nitrogen-rich gas in heat exchange with the compressed air whereby the nitrogen-rich gas is warmed to about atmospheric temperature, passing the warmed nitrogen-rich gas over surfaces upon which frost had previously been deposited by the compressed air whereby frost is removed therefrom, passing the nitrogen-rich gas through absorbent material which had previously absorbed moisture from the compressed air whereby moisture is expelled therefrom, changing the flow of compressed air to pass through the absorbent material from which moisture has been expelled and to pass over the surfaces from which frost has been removed by the returning nitrogen-rich gas, and at the same time changing the flow of returning nitrogen-rich gas to pass over the surfaces upon which frost has been deposited and to pass through the absorbent material which has absorbed moisture from the compressed air.

2. Process of extracting oxygen from atmospheric air as in claim 1 including warming the nitrogen-rich gas by heat exchange with the compressed air before expanding the nitrogen-rich gas.

3. Process of extracting oxygen from atmospheric air as in claim 1 including commingling the nitrogen-gas product with the expanded nitrogen-rich gas before returning the expanded nitrogen-rich gas in heat exchange with the compressed air.

4. Process of extracting oxygen from atmospheric air as in claim 1 including raising the pressure of the oxygen-liquid product and then returning the oxygen-liquid product in heat exchange with the compressed air.

5. Process of extracting oxygen from atmospheric air as in claim 1 including vaporizing the oxygen-liquid product by heat exchange with the nitrogen-rich gas from the preliminary rectification and then returning the vaporized oxygen in heat exchange with the compressed air.

6. Process of extracting oxygen from atmospheric air as in claim 1 including recovery of the external work of the expanding nitrogen-rich gas in compressing the atmospheric air.

7. Process of extracting oxygen from atmospheric air which includes compressing and cooling the atmospheric air until it is partly liquefied, subjecting the more or less liquefied air to a preliminary rectification to separate it into a nitrogen-rich gas and an oxygen-rich liquid, subjecting the oxygen-rich liquid to a final rectification to separate it into a nitrogen-gas product and an oxygen-liquid product, vaporizing part of the oxygen-liquid product for utilization as reflux vapor in the final rectification by heat exchange with the nitrogen-rich gas to liquefy part of it for utilization as reflux liquid in the preliminary rectification, augmenting the reflux liquid in the preliminary rectification by condensing another part of the nitrogen-rich gas by heat exchange with the nitrogen-gas product, expanding the remaining nitrogen-rich gas with performance of external work to remove excess heat from the process, and warming the expanded nitrogen-rich gas and the nitrogen-gas product by heat exchange with the compressed air.

8. Apparatus for extracting oxygen from atmospheric air which includes a compressor for compressing the atmospheric air, means for cooling the compressed air until it is more or less liquefied, a preliminary rectifier for separating the more or less liquefied air into nitrogen-rich gas and oxygen-rich liquid, a final rectifier for separating the oxygen-rich liquid into a nitrogen-gas product and an oxygen-liquid product, a vaporizer for vaporizing part of the oxygen-liquid product for utilization as reflux vapor in the final rectifier by heat exchange with the nitrogen-rich gas to liquefy part of it for utilization as reflux liquid in the preliminary rectifier, a condenser for augmenting the reflux liquid in the preliminary rectifier by liquefying another part of the nitrogen-rich gas in heat exchange with the nitrogen-gas product from the final rectifier, an expander for expanding the remaining nitrogen-rich gas with performance of external work to remove excess heat from the apparatus, and means for returning the expanded nitrogen-rich gas in heat exchange with the compressed air.

9. Apparatus for extracting oxygen from atmospheric air which includes a compressor for compressing the atmospheric air, driers in duplicate containing absorbent material for removing water vapor by absorption from the compressed air, interchangers in duplicate containing cooling surfaces for cooling the compressed air and removing water vapor therefrom in the form of frost deposited on the cooling surfaces by heat exchange with returning nitrogen-rich gas, means for passing the compressed air through one of said driers and one of said interchangers, a liquefier for partly liquefying the cooled compressed air by heat exchange with returning nitrogen-rich gas, a preliminary rectifier for separating the partly liquefied air into nitrogen-rich gas and oxygen-rich liquid, a final rectifier for separating the oxygen-rich liquid into a nitrogen-gas product and an oxygen-liquid product, a vaporizer for vaporizing part of the oxygen-liquid product for utilization as reflux vapor in the final rectifier by heat exchange with the nitrogen-rich gas to liquefy part of it for utilization as reflux liquid in the preliminary rectifier, an expander for expanding the remaining nitrogen-rich gas with performance of external work to remove excess heat from the apparatus, means for returning the nitrogen-rich gas through the one of said interchangers in heat exchange with the compressed air whereby the nitrogen-rich gas is warmed to about room temperature, means for passing the warmed nitrogen-rich gas through the other of said interchangers whereby any accumulated frost is removed from the cooling surfaces therein and through the other of said driers whereby any absorbed moisture is expelled from the absorbent material therein, and means for interchanging the duplicate driers and interchangers whereby the compressed air is caused to flow through absorbent material from which moisture has been expelled and over cooling surfaces from which frost has been removed by the nitrogen-rich gas and the nitrogen-rich gas is caused to return through the other interchanger in heat exchange with the compressed air and thence through the interchanger over cooling surfaces upon which frost has been deposited to defrost the cooling surfaces and through the drier containing absorbent material which has absorbed water vapor to reactivate the absorbent material.

WILLIAM LANE DE BAUFRE.

REFERENCES CITED

The following references are of record in the file of this patent:

UNITED STATES PATENTS

| Number | Name | Date |
| --- | --- | --- |
| 1,376,985 | Wilkinson | May 3, 1921 |
| 1,394,955 | Von Recklinghausen | Oct. 25, 1921 |
| 1,604,240 | Schlitt et al. | Oct. 26, 1926 |
| 1,607,321 | Van Nuys | Nov. 16, 1926 |
| 1,612,164 | Van Nuys | Dec. 28, 1926 |
| 1,696,558 | Van Nuys | Dec. 25, 1928 |
| 1,774,462 | Van Nuys et al. | Aug. 26, 1930 |
| 1,968,518 | Fraser | July 31, 1934 |
| 2,093,805 | De Baufre | Sept. 21, 1937 |
| 2,105,214 | De Baufre | Jan. 11, 1938 |
| 2,113,680 | De Baufre | Apr. 12, 1938 |
| 2,256,421 | Borchardt | Sept. 16, 1941 |
| 2,280,383 | De Baufre | Apr. 21, 1942 |
| 2,334,632 | Koehler | Nov. 16, 1943 |
| 2,337,474 | Kornemann et al. | Dec. 21, 1943 |
| 2,380,417 | De Baufre | July 31, 1945 |